US012600405B2

(12) United States Patent
Ohmori

(10) Patent No.: US 12,600,405 B2
(45) Date of Patent: Apr. 14, 2026

(54) VEHICLE CONTROL DEVICE, VEHICLE CONTROL PROGRAM, AND VEHICLE CONTROL METHOD

(71) Applicants: ADVICS CO., LTD., Kariya (JP); J-QuAD DYNAMICS INC., Tokyo (JP); DENSO CORPORATION, Kariya-city (JP); AISIN CORPORATION, Kariya (JP); JTEKT CORPORATION, Kariya (JP)

(72) Inventor: Yosuke Ohmori, Kariya (JP)

(73) Assignees: ADVICS CO., LTD., Kariya (JP); J-QuAD DYNAMICS INC., Tokyo (JP); DENSO CORPORATION, Kariya-city (JP); AISIN CORPORATION, Kariya (JP); JTEKT CORPORATION, Kariya (JP)

( * ) Notice: Subject to any disclaimer, the term of this patent is extended or adjusted under 35 U.S.C. 154(b) by 80 days.

(21) Appl. No.: 18/695,179

(22) PCT Filed: Sep. 22, 2022

(86) PCT No.: PCT/JP2022/035290
§ 371 (c)(1),
(2) Date: Mar. 25, 2024

(87) PCT Pub. No.: WO2023/054144
PCT Pub. Date: Apr. 6, 2023

(65) Prior Publication Data
US 2025/0002079 A1      Jan. 2, 2025

(30) Foreign Application Priority Data

Sep. 30, 2021    (JP) ................................. 2021-161132

(51) Int. Cl.
| | | |
|---|---|---|
| *B60R 25/021* | (2013.01) | |
| *B60W 10/20* | (2006.01) | |
| *B62D 6/00* | (2006.01) | |

(52) U.S. Cl.
CPC ............. *B62D 6/002* (2013.01); *B60W 10/20* (2013.01); *B60W 2710/207* (2013.01)

(58) Field of Classification Search
CPC .............................. B60R 25/021; B62D 6/002
See application file for complete search history.

(56) References Cited

U.S. PATENT DOCUMENTS

| | | | |
|---|---|---|---|
| 11,993,262 B2 * | 5/2024 | Collins | ................ B62D 7/1581 |
| 2015/0014952 A1 * | 1/2015 | Morikawa | ................ B62D 3/02 |
| | | | 280/91.1 |

(Continued)

FOREIGN PATENT DOCUMENTS

| | | |
|---|---|---|
| DE | 10 2016 223 766 A1 | 5/2018 |
| JP | 2012-232676 A | 11/2012 |
| JP | 2018-161917 A | 10/2018 |

OTHER PUBLICATIONS

International Search Report issued Dec. 13, 2022 in PCT/JP2022/035290, filed on Sep. 22, 2022, 3 pages.

*Primary Examiner* — Long T Tran
(74) *Attorney, Agent, or Firm* — Oblon, McClelland, Maier & Neustadt, L.L.P.

(57) ABSTRACT

A vehicle includes vehicle devices configured to adjust a lateral movement amount of the vehicle, and a steering wheel lock mechanism. The vehicle devices include a front-wheel steering device and a remaining device that is a device other than the front-wheel steering device. When there is an anomaly in the front-wheel steering device, a vehicle control device switches a state of the steering wheel lock mechanism from a deactivated state to an activated state. The control device adjusts the amount of lateral movement of the (Continued)

vehicle by activating the remaining device when rotation of the steering wheel is disabled.

2 Claims, 10 Drawing Sheets

(56) References Cited

U.S. PATENT DOCUMENTS

| | | | |
|---|---|---|---|
| 2018/0224274 A1* | 8/2018 | Shimada | G01M 17/04 |
| 2019/0367087 A1* | 12/2019 | De Grammont | B62D 7/142 |
| 2020/0377150 A1 | 12/2020 | Hidaka et al. | |
| 2021/0253162 A1* | 8/2021 | Thompson | B60T 8/246 |
| 2021/0270333 A1* | 9/2021 | Ogawa | B60T 8/1755 |
| 2022/0097704 A1* | 3/2022 | Collins | B60K 1/02 |
| 2023/0106423 A1* | 4/2023 | Wang | B62D 7/226 |
| | | | 180/445 |
| 2023/0249687 A1* | 8/2023 | Omohundro | B60W 30/18145 |
| | | | 701/41 |

* cited by examiner (a) Yaw Rate (b) Steered Angle of Front Wheels (c) Steered Angle of Rear Wheels (a) Yaw Rate (b) Steered Angle of Front Wheels (c) Steered Angle of Rear Wheels

VEHICLE CONTROL DEVICE, VEHICLE CONTROL PROGRAM, AND VEHICLE CONTROL METHOD

TECHNICAL FIELD

The present disclosure relates to a vehicle control device, a vehicle control program, and a vehicle control method.

BACKGROUND ART

Patent Literature 1 discloses an example of a control device that causes a vehicle to turn by generating a difference in braking force or a difference in driving force between left and right wheels when an anomaly occurs in a steering device that adjusts steering of the left and right wheels.

CITATION LIST

Patent Literature

Patent Document 1: German Patent Application Publication No. 102016223766

BRIEF SUMMARY

Technical Problem

When a vehicle is turning, self-aligning torque is generated in the wheels. Thus, when the vehicle is caused to turn by generating a difference in braking force or a difference in driving force between the left and right wheels as described above, the generated self-aligning torque may prevent the vehicle from turning in accordance with a request. Therefore, there is room for improvement in turning the vehicle when the steering device cannot be used.

Solution to Problem

In one general aspect, a vehicle control device is employed in a vehicle. The vehicle includes wheels, vehicle devices configured to adjust a lateral movement amount of the vehicle, a steering wheel lock mechanism that is selectively switched between an activated state in which the steering wheel lock mechanism disables rotation of a steering wheel and a deactivated state in which the steering wheel lock mechanism allows rotation of the steering wheel, and a steering shaft that is coupled to front wheels of the wheels and steers the front wheels by being actuated in accordance with rotation of the steering wheel. The vehicle devices include a front-wheel steering device that applies, to the steering shaft, a steering force for steering the front wheels, and a remaining device that is a device other than the front-wheel steering device. The vehicle control device includes a steering wheel lock control unit that, when there is an anomaly in the front-wheel steering device, switches the state of the steering wheel lock mechanism from the deactivated state to the activated state, and a remaining device control unit that adjusts the lateral movement amount of the vehicle by activating the remaining device when the steering wheel lock mechanism is in the activated state.

In another general aspect, a vehicle control program is executed by an execution device of a vehicle. The vehicle includes wheels, vehicle devices configured to adjust a lateral movement amount of the vehicle, a steering wheel lock mechanism that is selectively switched between an activated state in which the steering wheel lock mechanism disables rotation of a steering wheel and a deactivated state in which the steering wheel lock mechanism allows rotation of the steering wheel, and a steering shaft that is coupled to front wheels of the wheels and steers the front wheels by being actuated in accordance with rotation of the steering wheel. The vehicle devices include a front-wheel steering device that applies, to the steering shaft, a steering force for steering the front wheels, and a remaining device that is a device other than the front-wheel steering device. The vehicle control program causes the execution device to execute a steering wheel lock control process that, when there is an anomaly in the front-wheel steering device, switches the state of the steering wheel lock mechanism from the deactivated state to the activated state. The vehicle control program also causes the execution device to execute a remaining device control process that adjusts the lateral movement amount of the vehicle by activating the remaining device when the steering wheel lock mechanism is in the activated state.

In a further general aspect, a control method of a vehicle is provided. The vehicle includes wheels, vehicle devices configured to adjust a lateral movement amount of the vehicle, a steering wheel lock mechanism that is selectively switched between an activated state in which the steering wheel lock mechanism disables rotation of a steering wheel and a deactivated state in which the steering wheel lock mechanism allows rotation of the steering wheel, and a steering shaft that is coupled to front wheels of the wheels and steers the front wheels by being actuated in accordance with rotation of the steering wheel. The vehicle devices include a front-wheel steering device that applies, to the steering shaft, a steering force for steering the front wheels, and a remaining device that is a device other than the front-wheel steering device. The control method includes: when there is an anomaly in the front-wheel steering device, switching the state of the steering wheel lock mechanism from the deactivated state to the activated state; and adjusting the lateral movement amount of the vehicle by activating the remaining device when the steering wheel lock mechanism is in the activated state.

DESCRIPTION OF EMBODIMENTS

First Embodiment

A vehicle control device, a vehicle control program, and a vehicle control method according to a first embodiment will now be described with reference to FIGS. 1 to 5.

Figure 1:
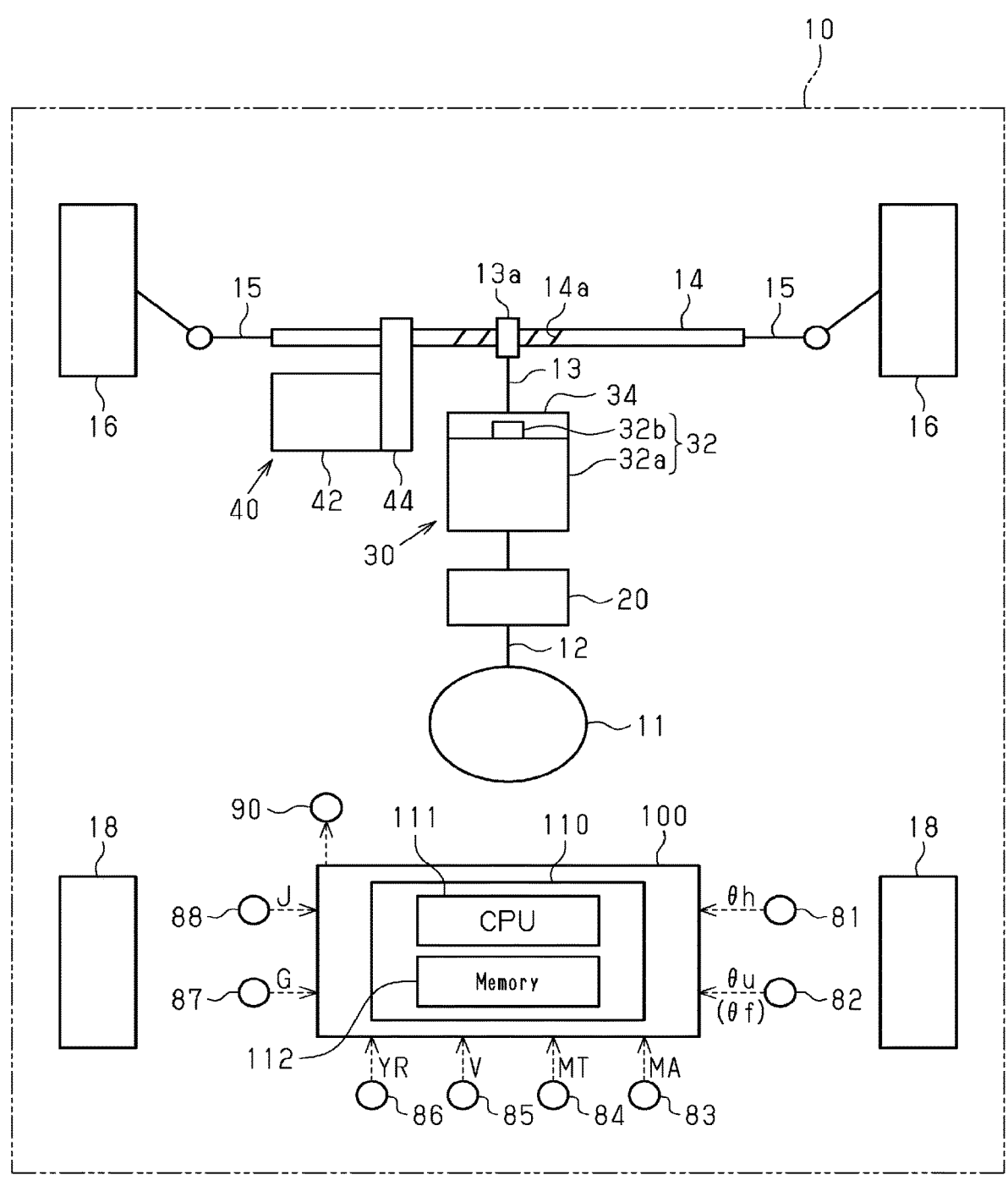
FIG. 1 is a diagram schematically showing a configuration of a vehicle equipped with a control device, which is a vehicle control device according to a first embodiment.

FIG. 1 shows a vehicle 10 equipped with a control device 100, which is a vehicle control device according to the present embodiment.

Overall Configuration of Vehicle

As shown in FIG. 1, the vehicle 10 includes a steering wheel 11, an input shaft 12, an output shaft 13, two front wheels 16, and two rear wheels 18. The vehicle 10 also includes two vehicle devices configured to adjust a yaw rate YR, which is a lateral movement amount of the vehicle 10. One of the two vehicle devices is a front-wheel steering device 40, and the other is a steered angle adjustment device 30. In the present embodiment, the steered angle adjustment device 30 corresponds to a remaining device.

Since the steering wheel 11 is coupled to the input shaft 12, the steering wheel 11 rotates integrally with the input shaft 12. The input shaft 12 is coupled to the output shaft 13 through the steered angle adjustment device 30. The output shaft 13 is coupled to a steering shaft 14. Pinion teeth 13a formed on the output shaft 13 mesh with rack teeth 14a formed on the steering shaft 14. The output shaft 13 and the steering shaft 14 thus operate in conjunction with each other. When the output shaft 13 rotates, the steering shaft 14 moves linearly. The opposite ends of the steering shaft 14 are coupled to the left and right front wheels 16 by tie rods 15, respectively. The steering shaft 14 is actuated in response to operation of the input shaft 12 and the like due to rotation of the steering wheel 11, so that the two front wheels 16 are steered.

The steered angle adjustment device 30 isolates transmission of force between the steering wheel 11 and the steering shaft 14. The steered angle adjustment device 30 includes an electric motor 32 and the speed reduction mechanism 34. The electric motor 32 includes a housing 32a and a drive shaft 32b, which protrudes from the housing 32a. The housing 32a accommodates a stator and a rotor. The stator is fixed to the housing 32a to rotate integrally with the housing 32a. The rotor is coupled to the drive shaft 32b to rotate integrally with the drive shaft 32b. When the electric motor 32 is driven to rotate the drive shaft 32b, the output shaft 13 is rotated relative to the input shaft 12. This changes a steered angle ratio Z, which is the ratio of a steered angle $\theta f$ of the front wheels 16 to a steering angle $\theta h$, which is the rotation angle of the steering wheel 11. Thus, in a situation in which the steering angle $\theta h$ is fixed, the steered angle $\theta f$ of the front wheels 16 is changed by activating the steered angle adjustment device 30 to change the steered angle ratio Z.

The steering angle $\theta h$ is defined as an angle from the neutral position of the steering wheel 11, which corresponds to a straight-ahead state of the vehicle 10, and has a positive or negative value in accordance with the turning direction of the steering wheel 11. Likewise, the steered angle $\theta f$ of the front wheels 16 is defined as an angle from the neutral position of the front wheels 16, which corresponds to a straight-ahead state of the vehicle 10, and has a positive or negative value in accordance with the steered direction of the front wheels 16.

The front-wheel steering device 40 includes an electric motor 42 and a transmission mechanism 44. The drive shaft of the electric motor 42 is coupled to the steering shaft 14 through the transmission mechanism 44. The transmission mechanism 44 converts rotation of the drive shaft of the electric motor 42 into a linear motion of the steering shaft 14. Thus, when the steering shaft 14 moves linearly in response to operation of the electric motor 42, the two front wheels 16 are steered. In other words, the electric motor 42 applies a steering force, which is a force that steers the front wheels 16, to the steering shaft 14.

The vehicle 10 includes a steering wheel lock mechanism 20. The steering wheel lock mechanism 20 is switched between an activated state in which the steering wheel lock mechanism 20 disables rotation of the steering wheel 11 and a deactivated state in which the steering wheel lock mechanism 20 allows rotation of the steering wheel 11. In the present embodiment, the steering wheel lock mechanism 20 disables rotation of the steering wheel 11 by restricting rotation of the input shaft 12.

Figure 2:
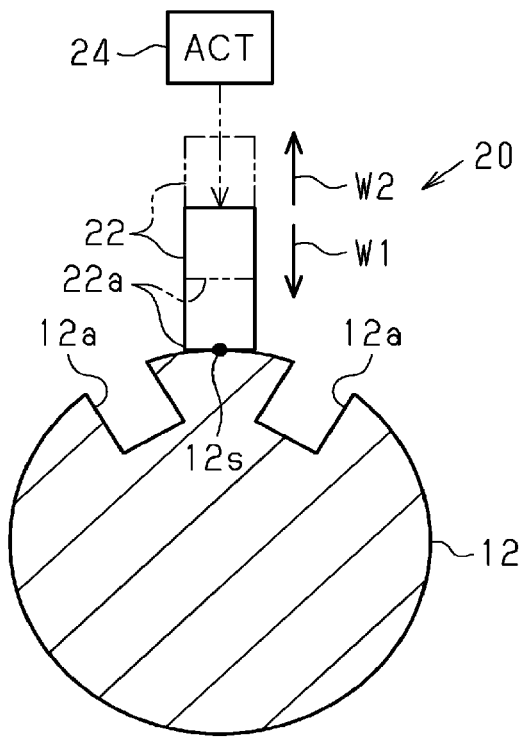
FIG. 2 is an explanatory cross-sectional view showing a steering wheel lock mechanism of the vehicle shown in FIG. 1.
Figure 3:
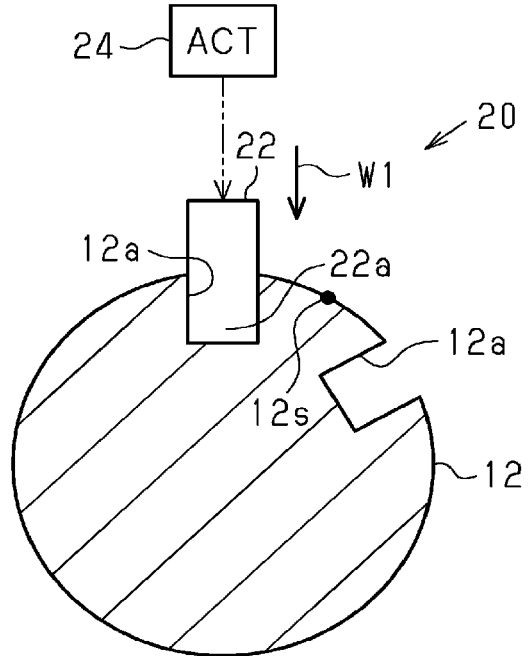
FIG. 3 is an explanatory cross-sectional view showing the steering wheel lock mechanism for the vehicle shown in FIG. 1.

FIGS. 2 and 3 schematically illustrate the structure of the steering wheel lock mechanism 20. FIG. 2 shows the relationship between the steering wheel lock mechanism 20 and the input shaft 12 when the steering angle $\theta h$ is 0 (zero). FIG. 3 shows the relationship between the steering wheel lock mechanism 20 and the input shaft 12 when the steering angle $\theta h$ is not 0 (zero).

The steering wheel lock mechanism 20 includes a locking pin 22 and an actuator 24. The locking pin 22 is located radially outward from the input shaft 12. A distal end 22a of the locking pin 22 faces the circumferential surface of the input shaft 12. When the actuator 24 is driven, the locking pin 22 selectively moves in an approaching direction W1, which is a direction toward the input shaft 12, and a separating direction W2, which is a direction away from the input shaft 12. When the actuator 24 is driven to move the locking pin 22 in the approaching direction W1, the distal end 22a of the locking pin 22 is pressed against the input shaft 12 as shown by the solid line in FIG. 2. When the actuator 24 is driven to move the locking pin 22 in the separating direction W2, the locking pin 22 is separated from the input shaft 12 as shown by the long-dash double-short-dash line in FIG. 2.

In the present embodiment, the state of the steering wheel lock mechanism 20 in which the locking pin 22 is pressed against the input shaft 12 by driving the actuator 24 is an activated state. The state of the steering wheel lock mechanism 20 in which the locking pin 22 is separated from the input shaft 12 is a deactivated state.

The input shaft 12 includes two locking recesses 12$a$ configured to receive the distal end 22$a$ of the locking pin 22. The locking recesses 12$a$ are recessed radially inward from the circumferential surface of the input shaft 12. The two locking recesses 12$a$ are located at the same position as the locking pin 22 in a direction parallel to the central axis of the input shaft 12. The position of the input shaft 12 with which the locking pin 22 is in contact when the steering angle θh is 0 (zero) is referred to as a reference position 12$s$. The two locking recesses 12$a$ are arranged such that the reference position 12$s$ is located between the two locking recesses 12$a$. The distance from one of the locking recesses 12$a$ to the reference position 12$s$ is equal to the distance from the other locking recess 12$a$ to the reference position 12$s$.

As shown in FIG. 2, in a situation in which the steering angle θh is 0 (zero), the distal end 22$a$ of the locking pin 22 is not received by the locking recess 12$a$ even if the steering wheel lock mechanism 20 is in the activated state. This allows the input shaft 12 and the steering wheel 11 to rotate. However, when the steering angle θh is changed from 0 (zero) while the steering wheel lock mechanism 20 is in the activated state so that the locking pin 22 faces one of the locking recesses 12$a$, the distal end 22$a$ of the locking pin 22 is received by the locking recess 12$a$ as shown in FIG. 3. The locking pin 22 thus disables rotation of the input shaft 12 and the steering wheel 11. In the present embodiment, the distal end 22$a$ of the locking pin 22 is received by the locking recess 12$a$ even if the steering angle θh changes from 0 (zero) to the positive side or from 0 (zero) to the negative side. The steering angle θh when the locking pin 22 faces one of the locking recesses 12$a$ is referred to as a locking angle θhQ.

As shown in FIG. 1, a vehicle 10 includes an information detection system. The information detection system includes, for example, a steering angle sensor 81, an output shaft sensor 82, a current sensor 83, and a temperature sensor 84. The information detection system also includes, for example, a vehicle speed sensor 85, a yaw rate sensor 86, a GPS receiver 87, and a perimeter monitoring device 88. The steering angle sensor 81 detects the steering angle θh of the steering wheel 11. The output shaft sensor 82 detects a rotation angle θu of the output shaft 13. The current sensor 83 detects a current value MA of the current flowing through the electric motor 42 of the front-wheel steering device 40. The temperature sensor 84 detects a temperature MT of the electric motor 42 of the front-wheel steering device 40. The vehicle speed sensor 85 detects a vehicle speed V, which is the traveling speed of the vehicle 10. The yaw rate sensor 86 detects the yaw rate YR of the vehicle 10. The GPS receiver 87 receives signals regarding the current position coordinates G of the vehicle 10 from GPS satellites. The perimeter monitoring device 88 includes an image capturing device such as a camera, and a radar. The perimeter monitoring device 88 obtains, for example, perimeter monitoring information J of the vehicle 10, such as captured images of the perimeter of the vehicle 10 and information regarding whether there is an obstacle around the vehicle 10. Devices such as sensors that form the information detection system output signals corresponding to the detected information to the control device 100.

The vehicle 10 includes a notification device 90. The notification device 90 notifies an occupant of the vehicle 10 of an anomaly in the front-wheel steering device 40. Examples of the notification device 90 include a lamp, a display screen, and a speaker.

Overall Configuration of Control Device

The control device 100 includes processing circuitry 110. The processing circuitry 110 includes a CPU 111 and a memory 112. The memory 112 stores various types of control programs executed by the CPU 111. The CPU 111 corresponds to the execution device that executes control programs.

The control device 100 has an autonomous driving function. The autonomous driving function causes the vehicle 10 to travel autonomously without operation by the driver of the vehicle 10. The control device 100 has an automatic steering function, which is part of the autonomous driving functions. The automatic steering function causes the vehicle 10 to turn autonomously without operation of the steering wheel 11 by the driver.

By causing the CPU 111 to execute a control program for the automatic steering function, the processing circuitry 110 functions as a request generating unit, an anomaly determining unit, a front wheel steering control unit, a steering wheel lock control unit, and a remaining device control unit.

The request generating unit derives request base values, which are necessary for turning of the vehicle 10. The request generating unit derives, as the request base values, a request steered angle θf*, which is a requested value of the steered angle θf of the front wheels 16, and a request yaw rate YR*, which is a requested value of the yaw rate YR of the vehicle 10. The manner of deriving the request steered angle θf* and the request yaw rate YR* will be discussed below.

The anomaly determining unit determines whether there is an anomaly in the front-wheel steering device 40. A steering force that needs to be applied to the front wheels 16 in order to adjust the steered angle θf of the front wheels 16 based on the request steered angle θf* is referred to as a request steering force F1. The steering force corresponding to the maximum output of the electric motor 42 of the front-wheel steering device 40 is referred to as a maximum steering force F2. For example, when an internal anomaly occurs in the electric motor 42 due to wear or the like, a current value at which the electric motor 42 can be energized may decrease, so that the maximum steering force F2 may decrease. When the maximum steering force F2 decreases, the maximum steering force F2 may become unable to be made greater than or equal to the request steering force F1. In this regard, the anomaly determining unit determines whether there is an anomaly in the front-wheel steering device 40 based on the relative magnitude of the maximum steering force F2 and the request steering force F1.

When there is no anomaly in the front-wheel steering device 40, the front wheel steering control unit causes the vehicle 10 to turn by activating the front-wheel steering device 40. That is, the front wheel steering control unit drives the electric motor 42 of the front-wheel steering device 40 such that the steered angle θf of the front wheels 16 agrees with the request steered angle θf*. In contrast, when there is an anomaly in the front-wheel steering device

40, the front wheel steering control unit stops energization of the electric motor 42 of the front-wheel steering device 40.

When there is an anomaly in the front-wheel steering device 40, the steering wheel lock control unit switches the state of the steering wheel lock mechanism 20 from a deactivated state to an activated state. When there is no anomaly in the front-wheel steering device 40, the steering wheel lock control unit sets the state of the steering wheel lock mechanism 20 to the deactivated state.

In a case in which the steering wheel lock mechanism 20 is in the activated state, the remaining device control unit adjusts the yaw rate YR of the vehicle 10 by activating a remaining device that is a device other than the front-wheel steering device 40. Specifically, the remaining device control unit adjusts the steered angle ratio Z by activating the steered angle adjustment device 30 such that the steering angle θh is the lock angle θhQ and the steered angle θf of the front wheels 16 agrees with the request steered angle θf*.

In the present embodiment, the remaining device control unit executes a process that disables rotation of the steering wheel 11 by rotating the steering wheel 11 until the steering angle θh agrees with the lock angle θhQ, and a process that steers the front wheels 16 such that the steered angle θf agrees with the request steered angle θf* after rotation of the steering wheel 11 is disabled. The latter process corresponds to a process for adjusting the yaw rate YR of the vehicle 10 through operation of the steered angle adjustment device 30 when the steering wheel lock mechanism 20 is activated and rotation of the steering wheel 11 is disabled.

Procedure for Causing Vehicle to Turn Autonomously

A processing routine executed by the processing circuitry 110 of the control device 100 when the vehicle 10 is caused to turn using the automatic steering function will now be described with reference to FIG. 4. The processing circuitry 110 executes this processing routine when the CPU 111 executes a control program stored in the memory 112 of the processing circuitry 110. Therefore, it can also be said that the processes of this processing routine are executed by the CPU 111, which is an execution device.

In this processing routine, the processing circuitry 110 functions as a request generating unit to derive the request yaw rate YR* and the request steered angle θf* as request base values in step S10. The process of step S10 executed by the processing circuitry 110 as the request generating unit is also referred to as a request generating process.

One example of the request generating process will now be described. In deriving the request base values, the processing circuitry 110 derives a subsequent target trajectory for the vehicle 10 based on, for example, map data provided by the navigation device, the current position coordinates G of the vehicle 10, and the perimeter monitoring information J. Then, the control device 100 derives the request yaw rate YR* and the request steered angle θf* based on the current traveling information of the vehicle 10 such as the vehicle speed V and the yaw rate YR, and the derived target trajectory.

After deriving the request base values, the processing circuitry 110 advances the process to step S20. In step S20, the processing circuitry 110 derives the request steering force F1. The processing circuitry 110 calculates the request steering force F1 using, for example, the following relational expression (Expression 1). In the relational expression (Expression 1), Kf represents a cornering power of the front wheels 16, and Β* represents a requested value of a vehicle slip angle. Lf represents the distance between the center of gravity of the vehicle 10 and the axle of the front wheels 16, and LN represents the sum of a caster trail and a pneumatic trail. To derive the request steering force F1, the processing circuitry 110 substitutes the latest vehicle speed V for V in the relational expression (Expression 1), and substitutes the request yaw rate YR* and the request steering angle θf* derived in step S10 for YR* and θf* in the relational expression (Expression 1). Among the above-described parameters necessary for deriving the request steering force F1, for those that have positive and negative values, such as the request steering angle θf*, their absolute values are used.

$$F1=Kf\cdot(\beta^*+Lf/Vf/YR^*-\theta f^*)\cdot LN \qquad \text{(Expression 1)}$$

Subsequently, in step S30, the processing circuitry 110 derives the maximum steering force F2. The control device 100 calculates the maximum steering force F2 using, for example, a relational expression (Expression 2). In the relational expression (Expression 2), I represents the maximum value of the current value at which the electric motor 42 of the front-wheel steering device 40 can be energized under the present condition, and LS represents a parameter related to the positional relationship between the ground contact point of each front wheel 16 and the tie rod 15. D represents a conversion factor. Thus, the greater the maximum value I of the current value, the greater the value derived as the maximum steering force F2 becomes.

$$F2=I\cdot D\cdot LS \qquad \text{(Expression 2)}$$

Next, in step S40, the processing circuitry 110 functions as an anomaly determining unit to determine whether the request steering force F1 derived in step S20 is less than or equal to the maximum steering force F2 calculated in step S30. When the request steering force F1 is less than or equal to the maximum steering force F2, it is determined there is no anomaly in the front-wheel steering device 40. When the request steering force F1 is greater than the maximum steering force F2, it is determined that there is an anomaly in the front-wheel steering device 40. In the present embodiment, the process of step S40 executed by the processing circuitry 110 as the anomaly determining unit corresponds to the anomaly determination process.

When the request steering force F1 is less than or equal to the maximum steering force F2 in step S40 (YES), the processing circuitry 110 advances the process to step S50. In step S50, the processing circuitry 110 functions as a front wheel steering control unit to control the front-wheel steering device 40 based on the request steered angle θf* Specifically, the processing circuitry 110 controls the electric motor 42 of the front-wheel steering device 40 such that the steered angle θf of the front wheels 16 agrees with the request steered angle θf*. The process of step S50 executed by the processing circuitry 110 as the front wheel steering control unit is also referred to as a front wheel steering process.

When the front-wheel steering device 40 steers the front wheels 16 in step S50, the rotation angle of the electric motor 32 of the steered angle adjustment device 30 is maintained. The steering wheel 11 is thus rotated in conjunction with the steering of the front wheels 16. Accordingly, the steered angle θf of the front wheels 16 and the steering angle θh of the steering wheel 11 are maintained to be the same. After executing the process of step S50, the processing circuitry 110 temporarily ends the present processing routine. Then, when a prescribed control cycle elapses, the processing circuitry 110 starts executing the present processing routine.

When the request steering force F1 is greater than the maximum steering force F2 in step S40 (NO), the processing circuitry 110 advances the process to step S100. In step S100, the control device 100 causes the notification device 90 to notify the occupant of the anomaly in the front-wheel steering device 40.

Subsequently, in step S102, the processing circuitry 110 functions as a front wheel steering control unit, thereby stopping energization of the electric motor 42 of the front-wheel steering device 40. Then, the processing circuitry 110 advances the process to step S110.

In step S110, the processing circuitry 110 functions as a steering wheel lock control unit to switch the state of the steering wheel lock mechanism 20 from the deactivated state to the activated state. This moves the locking pin 22 in the approaching direction W1 so that the distal end 22a comes into contact with the input shaft 12. In the present embodiment, step S110 executed by the processing circuitry 110 as a steering wheel lock control unit corresponds to the steering wheel lock process. As described above, even when the steering wheel lock mechanism 20 is in the activated state, the distal end 22a of the locking pin 22 is not received by the locking recess 12a until the steering angle θh of the steering wheel 11 agrees with the lock angle θhQ. The steering wheel 11 is thus permitted to rotate. When the steering wheel lock mechanism 20 is switched to the activated state, the processing circuitry 110 advances the process to step S160.

In step S160, the processing circuitry 110 functions as a request generating unit to derive the request yaw rate YR* and the request steered angle θf* in the same manner as in the process of step S10. Subsequently, in step S170, the processing circuitry 110 functions as a remaining device control unit to adjust the steered angle ratio Z based on the request steered angle θf*, which has been derived in step S160. Specifically, the processing circuitry 110 controls the electric motor 32 of the steered angle adjustment device 30 such that the steered angle θf of the front wheels 16 agrees with the request steered angle θf*. At this time, the processing circuitry 110 determines the direction in which the front wheels 16 are to be steered based on the sign (positive or negative) of the request steered angle θf*, which has been derived in step S160. The processing circuitry 110 determines the rotation direction of the drive shaft 32b with respect to the housing 32a in the electric motor 32 such that the front wheels 16 are steered in that direction. In the present embodiment, the process of step S170 executed by the processing circuitry 110 as a remaining device control unit corresponds to the remaining device control process.

Subsequently, in step S180, the processing circuitry 110 determines whether a termination condition is met. The termination condition is met when both of the following criteria are satisfied: the vehicle 10 is not in the process of turning, and a request has been made to deactivate the automatic steering function. When it is determined that the vehicle 10 is traveling straight ahead based on the yaw rate YR or when the vehicle 10 has stopped, the vehicle 10 is considered not be turning. When the termination condition is not met (S180: NO), the processing circuitry 110 advances the process to step S160. When the termination condition is met (S180: YES), the processing circuitry 110 ends the present processing routine.

Operation and Advantages of First Embodiment

A case will now be described in which the vehicle 10 is caused to turn with an anomaly in the front-wheel steering device 40, with reference to FIG. 5.

Figure 5:
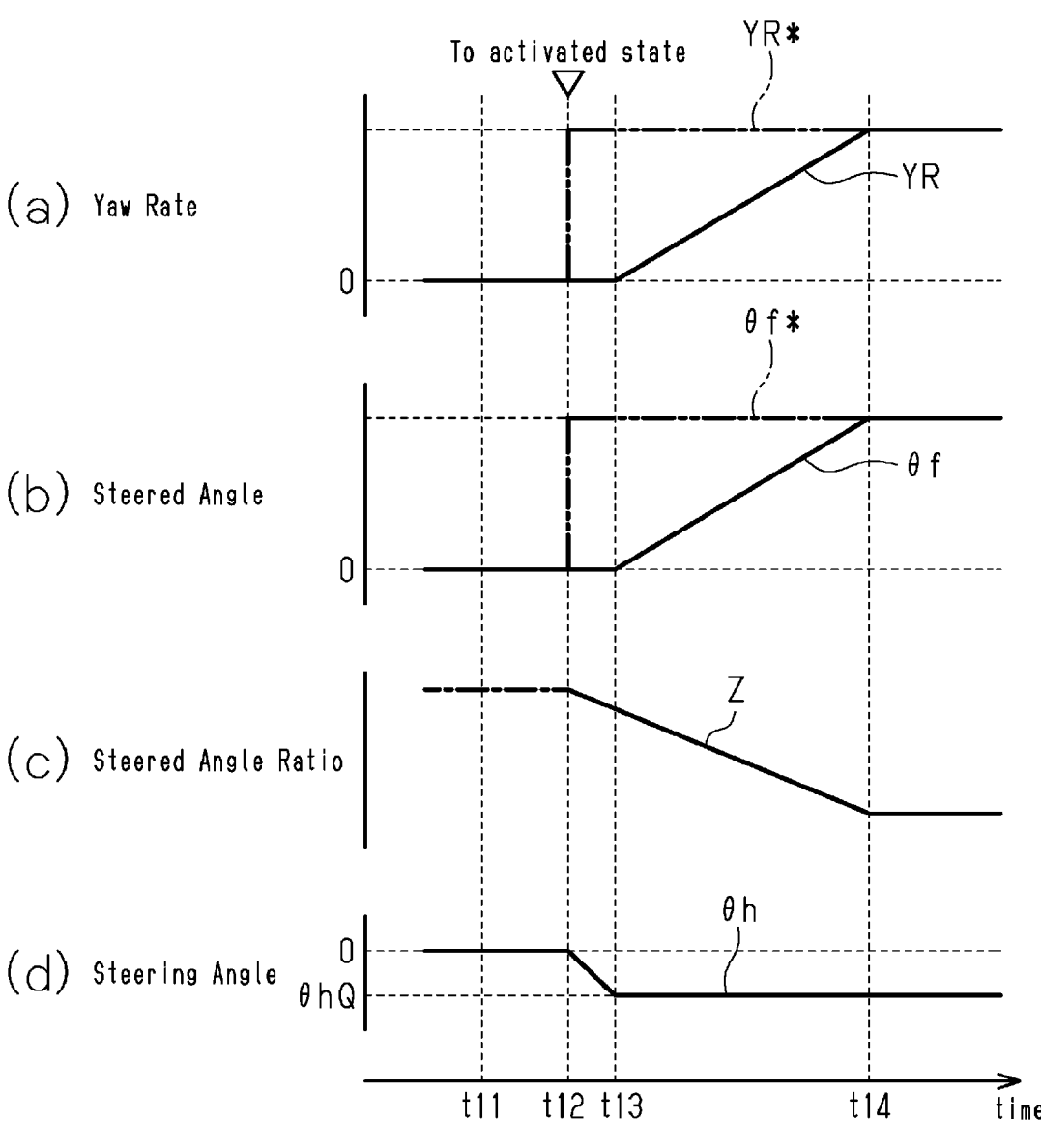
FIG. 5 is a timing diagram showing the behavior of the vehicle when the processing routine of the automatic steering function shown in FIG. 4 is executed.

In the example shown in FIG. 5, the vehicle 10 is traveling straight ahead at a point in time t11. As indicated by the long-dash double-short-dash lines in parts (a) and (b) of FIG. 5, a request for turning is made at a point in time t12, which is after the point in time t11, so that the yaw rate YR* and the request steered angle θf* become greater than 0 (zero). For illustrative purposes, the request yaw rate YR* and the request steered angle θf* are depicted to have changed largely in a single step at the point in time t12 in FIG. 5.

At the point in time t12, where the request for turning is made, if the maximum steering force F2 is less than the request steering force F1 (S40: NO), the state of the steering wheel lock mechanism 20 is switched from the deactivated state to the activated state (S110). As shown in part (d) of FIG. 5, the steering angle θh of the steering wheel 11 at the point in time t12 is 0 (zero), and the steering angle θh is not the lock angle θhQ. Thus, even when the steering wheel lock mechanism 20 is activated, rotation of the steering wheel 11 is still allowed.

When the steering wheel lock mechanism 20 is switched to the activated state, the steered angle adjustment device 30 starts changing the steered angle ratio Z as shown in part (c) of FIG. 5 (S170). Since the front wheels 16 are in contact with the ground, steering the front wheels 16 requires a force that counteracts the frictional force acting on the front wheels 16, which is dependent on the weight of the vehicle 10. Due to this frictional force, immediately after the start of the change in the steered angle ratio Z, the driving force of the electric motor 32 acts to rotate the housing 32a, which receives no resistance, rather than the drive shaft 32b of the electric motor 32. That is, the frictional force acting on the front wheels 16 hinders rotation of the drive shaft 32b of the electric motor 32 via the output shaft 13. As a result, the housing 32a and the steering wheel 11 are rotated while the drive shaft 32b is not rotated. Therefore, when the steered angle ratio Z starts to be changed at the point in time t12, the steering angle θh of the steering wheel 11 starts to change as shown in part (d) of FIG. 5, while the steered angle θf of the front wheels 16 remains unchanged as shown in part (b) of FIG. 5. Due to the relationship of relative rotation between the housing 32a and the drive shaft 32b in the electric motor 32, the steering wheel 11 is rotated in a direction opposite to the rotation direction corresponding to the request steered angle θf*. As shown in part (d) of FIG. 5, the steering angle θh agrees with the lock angle θhQ at a point in time t13 due to the rotation of the steering wheel 11. Then, the distal end 22a of the locking pin 22 of the steering wheel lock mechanism 20 is received by one of the locking recesses 12a. This disables rotation of the steering wheel 11.

Even after the steering wheel 11 becomes unable to rotate, the change in the steered angle ratio Z resulting from activation of the steered angle adjustment device 30 continues. When rotation of the steering wheel 11 is disabled, the driving force of the electric motor 32 rotates the drive shaft 32b instead of the housing 32a. That is, receiving a reaction force from the housing 32a in a fixed state, the driving force of the electric motor 32 counteracts the frictional force on the front wheels 16 and causes the drive shaft 32b, and consequently the output shaft 13, to rotate. Accordingly, as shown in part (b) of FIG. 5, after the point in time t13, at which rotation of the steering wheel 11 is disabled, the activation of the steered angle adjustment device 30 starts changing the steered angle θf of the front wheel 16. At a point in time t14, the steered angle θf of the front wheels 16 agrees with the request steered angle θf*. As the front wheels 16 are steered, the yaw rate YR of the vehicle 10 changes after the point in time t13. After the point in time t14, the vehicle 10 turns in accordance with the request yaw rate YR*.

Subsequently, the steered angle θf of the front wheels 16 is adjusted through activation of the steered angle adjustment device 30 with rotation of the steering wheel 11 disabled (S170). Specifically, disabling rotation of the steering wheel 11 causes the drive shaft 32b of the electric motor 32 of the steered angle adjustment device 30 and the front wheels 16 to operate in conjunction with each other. Thus, as in the case of operating the front wheels 16 with the front-wheel steering device 40, the front wheels 16 are directly operated by the steered angle adjustment device 30. Therefore, even if the front-wheel steering device 40 cannot be used, the vehicle 10 can turn without being affected by the self-aligning torque.

The example shown in FIG. 5 represents a case in which it is determined that there is an anomaly in the front-wheel steering device 40 before the vehicle 10 starts turning. However, an anomaly may occur in the front-wheel steering device 40 during turning of the vehicle 10. The present embodiment maintains the turning state of the vehicle 10 even in such a case. Specifically, if it is determined that there is an anomaly in the front-wheel steering device 40 during turning of the vehicle 10 (S40: YES), the state of the steering wheel lock mechanism 20 is switched from the deactivated state to the activated state (S110). Then, activation of the steered angle adjustment device 30 changes the steered angle ratio Z (S170). Accordingly, the steering wheel 11 is rotated toward the lock angle θhQ in association with the frictional force acting on the front wheels 16. When the steering angle θh agrees with the lock angle θhQ, rotation of the steering wheel 11 is disabled. After rotation of the steering wheel 11 is disabled, the steered angle θf of the front wheels 16 can be adjusted freely by activation of the steered angle adjustment device 30.

Second Embodiment

Figure 6:
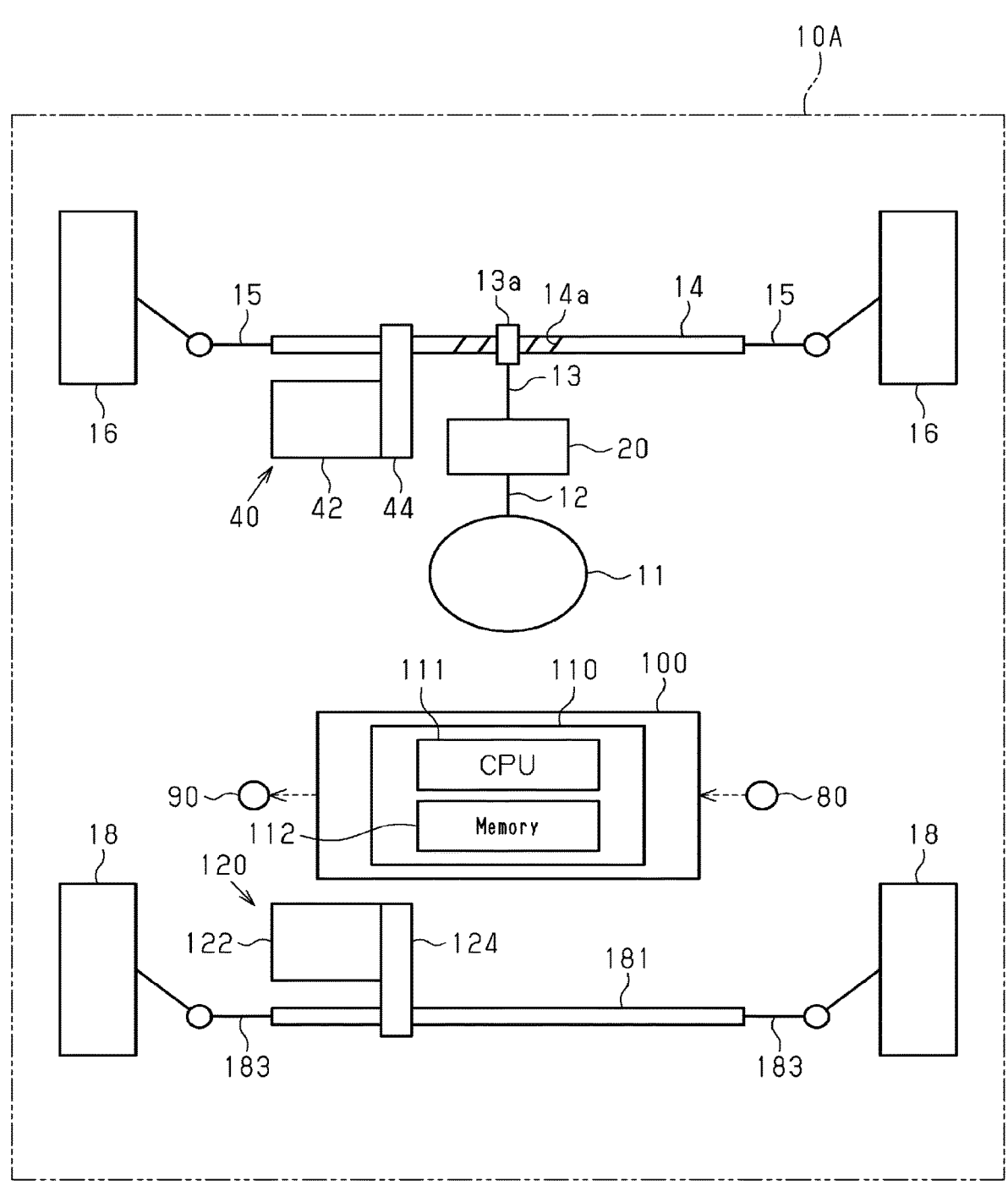
FIG. 6 is a diagram schematically showing a configuration of a vehicle equipped with a control device, which is a vehicle control device according to a second embodiment.

A vehicle control device, a vehicle control program, and a vehicle control method according to a second embodiment will now be described with reference to FIGS. 6 to 13. In the second embodiment, the vehicle devices mounted on a vehicle are different from those in the first embodiment. Accordingly, the contents of the remaining device control process are different from those in the first embodiment. The other parts are basically the same as the first embodiment. In the following description, portions different from those of the first embodiment will be mainly discussed, and description of contents overlapping with those of the first embodiment will be simplified or omitted. In FIG. 6, the same symbols as those in FIG. 1 are assigned to parts that are identical or substantially identical in function to those in FIG. 1. In FIG. 6, the devices forming an information detection system are collectively denoted by a single reference numeral 80.

As shown in FIG. 6, a vehicle 10A includes no angle adjustment device. The steering wheel 11 and the input shaft 12 are thus directly coupled to the output shaft 13. That is, the steering angle θh of the steering wheel 11 becomes equal to the steered angle θf of the front wheel 16.

The vehicle 10A includes a rear shaft 181 and a rear-wheel steering device 120. The opposite ends of the rear shaft 181 are coupled to the left and right rear wheels 18 by coupling components 183. The rear-wheel steering device 120 includes an electric motor 122 and a transmission mechanism 124. The drive shaft of the electric motor 122 is coupled to the rear shaft 181 by the transmission mechanism 124. The transmission mechanism 124 converts rotation of the drive shaft of the electric motor 122 into a linear motion of the rear shaft 181. When the rear shaft 181 performs a linear motion as the electric motor 122 is driven, the rear wheels 18 are steered. In this manner, the rear-wheel steering device 120 adjusts the steered angle θr of the rear wheels 18. The vehicle 10A includes a front-wheel steering device 40 and the rear-wheel steering device 120 as vehicle devices configured to adjust the yaw rate YR, which is a lateral movement amount of the vehicle 10A. In the present embodiment, the rear-wheel steering device 120 corresponds to a remaining device.

In the present embodiment, the control device 100 uses the steering wheel lock mechanism 20 and the rear-wheel steering device 120 when causing the vehicle 10A to turn under a situation in which there is an anomaly in the front-wheel steering device 40. Thus, the processing circuitry 110 of the control device 100 executes a remaining device control process as follows, after executing the same steering wheel lock process as that in the first embodiment. The processing circuitry 110 functions as a remaining device control unit to execute a first process and a second process as the remaining device control process.

In the first process, the remaining device control unit steers the front wheels 16 by steering the rear wheels 18 using the rear-wheel steering device 120 when the steering wheel lock mechanism 20 is in the activated state. Accordingly, the steered angle θf of the front wheels 16 is set to a lock steered angle θfQ. The lock steered angle θfQ is the steered angle θf of the front wheels 16 when the steering angle θh of the steering wheel 11 agrees with the lock angle θhQ. As described above, the steered angle θf of the front wheels 16 is equal to the steering angle θh of the steering wheel 11. Accordingly, the lock steered angle θfQ is equal to the lock angle θhQ.

In the second process, the remaining device control unit activates the rear-wheel steering device 120 to steer the rear wheels 18 when the first process is executed to disable rotation of the steering wheel 11. This causes the vehicle 10A to turn.

Procedure for Causing Vehicle to Turn Autonomously

Figure 7:
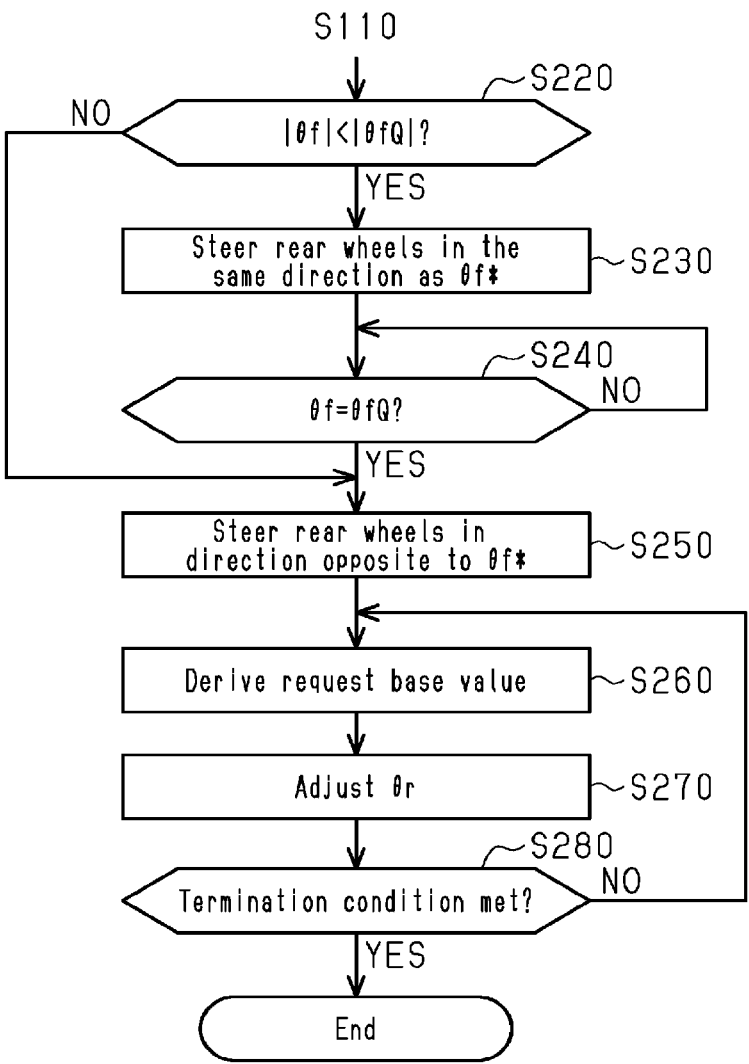
FIG. 7 is a flowchart illustrating a processing routine of an automatic steering function executed by the control device shown in FIG. 6.
Figure 8:
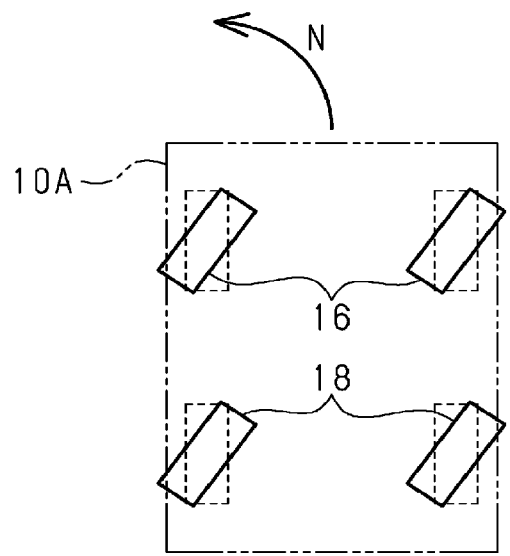
FIG. 8 is a diagram illustrating the principle of adjustment of the steered angle of front wheels by steering rear wheels.

A processing routine executed by the processing circuitry 110 of the control device 100 when the vehicle 10 is caused to turn using an automatic turning function will now be described with reference to FIG. 7.

Figure 4:
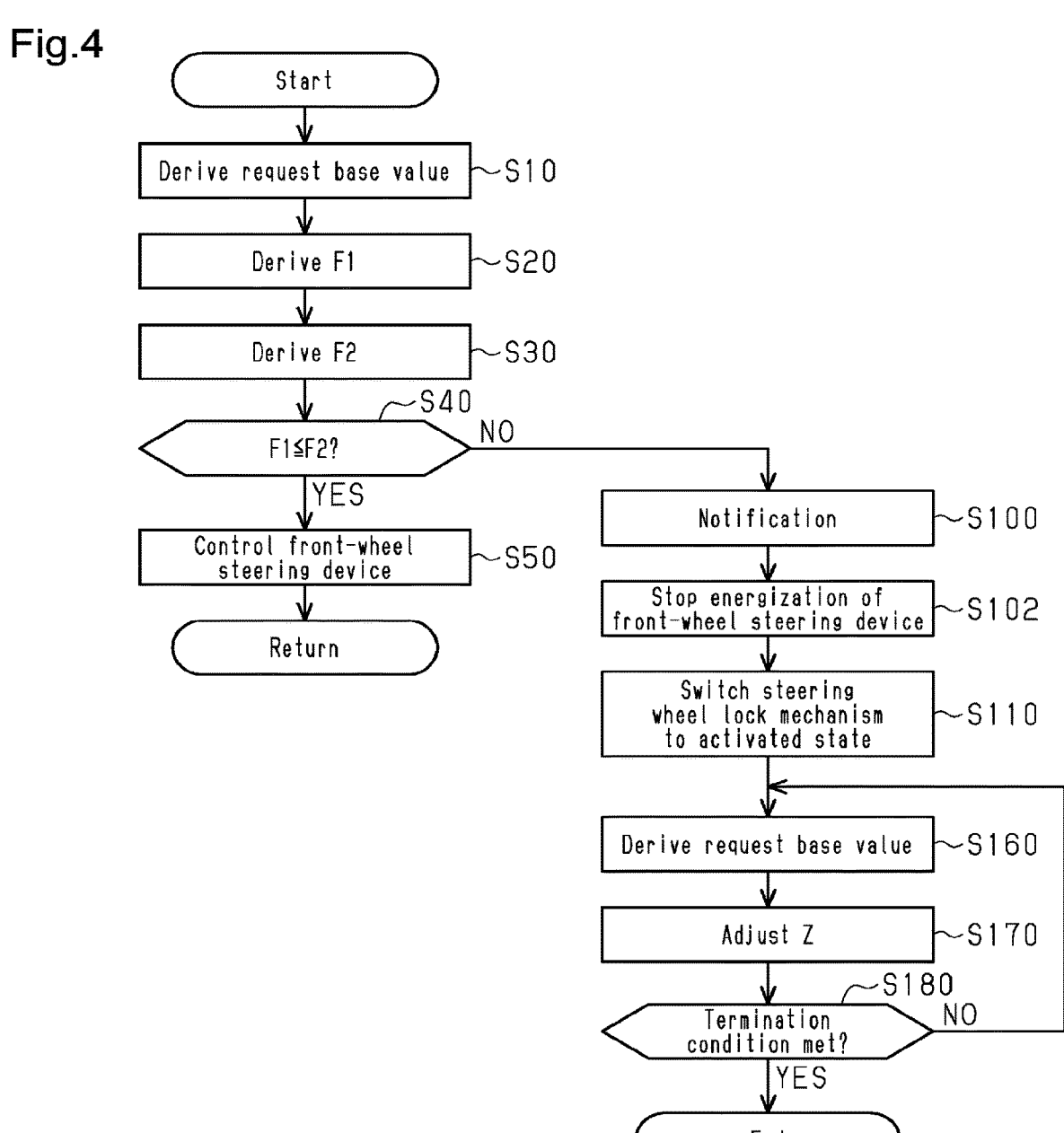
FIG. 4 is a flowchart illustrating a processing routine of an automatic steering function executed by the control device shown in FIG. 1.

When this processing routine is started, the processing circuitry 110 sequentially executes the processes of steps S10 to S110 shown in FIG. 4. When the processing circuitry 110 executes the process of step S110 to switch the state of the steering wheel lock mechanism 20 from the deactivated state to the activated state, the processing circuitry 110 advances the process to step S220.

In step S220, the processing circuitry 110 determines whether the absolute value of the steered angle θf of the front wheels 16 is less than the absolute value of the lock steered angle θfQ. When the absolute value of the steered angle θf is less than the absolute value of the lock steered angle θfQ (S220: YES), the processing circuitry 110 advances the process to step S230. When the absolute value of the steered angle θf is greater than or equal to the absolute value of the lock steered angle θfQ (S220: NO), the processing circuitry 110 advances the process to step S250.

In step S230, the processing circuitry 110 functions as the remaining device control unit so as to steer the rear wheels 18 in the same direction as the request steered angle θf* of the front wheels 16. That is, the processing circuitry 110 determines the direction of steering that is defined as the request steered angle θf* based on the sign (positive or negative) of the request steered angle θf*, which has been derived in step S10. The processing circuitry 110 controls the electric motor 122 of the rear-wheel steering device 120 such that the rear wheels 18 are steered in the same direction as the determined direction. At this time, the processing circuitry 110 sets the steered angle θr of the rear wheels 18 to a predetermined first steered angle. For the reasons discussed below, the front wheels 16 is steered in the direction of the request steered angle θf* by steering the rear wheels 18 in the same direction as the request steered angle θf*. The first steered angle is determined in advance through, for example, experiments or simulations, as an optimal value for facilitating steering of the front wheels 16. When steering the rear wheels 18 until the steered angle θr of the rear wheels 18 agrees with the first steered angle, the processing circuitry 110 advances the process to step S240.

In step S240, the processing circuitry 110 functions as a remaining device control unit to determine whether the steered angle θf of the front wheels 16 has reached the lock steered angle θfQ. The processing circuitry 110 performs the determination of step S240 by comparing the absolute value of the steered angle θf with the absolute value of the lock steered angle θfQ. Since the steering wheel lock mechanism 20 is in the activated state, it is determined that the rotation of the steering wheel 11 is disabled when the steered angle θf agrees with the lock steered angle θfQ. Thus, when the steered angle θf has not reached the lock steered angle θfQ (S240: NO), the processing circuitry 110 repeats the determination of step S240 until the steered angle θf agrees with the lock steered angle θfQ. If the steered angle θf reaches the lock steered angle θfQ (S240: YES), the processing circuitry 110 advances the process to step S250.

In step S250, the processing circuitry 110 functions as the remaining device control unit so as to steer the rear wheels 18 in the opposite direction from the request steered angle θf* of the front wheels 16. That is, as in the process of step S230, the processing circuitry 110 determines the direction of steering that is defined as the request steered angle θf* based on the sign (positive or negative) of the request steered angle θf*, which has been derived in step S10. The processing circuitry 110 controls the electric motor 122 of the rear-wheel steering device 120 such that the rear wheels 18 are steered in the opposite direction from the determined direction. Specifically, the processing circuitry 110 controls the electric motor 122 such that the steered angle θr of the rear wheels 18 agrees with a second steered angle. The second steered angle is a value as described below. The second steered angle is the steered angle θr of the rear wheels 18 required to achieve a request yaw rate YR*, which is derived in step S10 when the steered angle θf of the front wheels 16 is the lock steered angle θfQ in the same direction as the request steered angle θf*. When the steered angle θr agrees with the second steered angle, the processing circuitry 110 advances the process to step S260.

In the present embodiment, the processes of step S230 to step S250 executed by the processing circuitry 110, which functions as a remaining device control unit, correspond to the remaining device control process. Particularly, the processes of steps S230 and S240 correspond to the first process, and the process of step S250 corresponds to the second process.

The process of step S250 may also serve as the first process and the second process of the remaining device control process. Specifically, if the absolute value of the steered angle θf is greater than or equal to the absolute value of the lock steered angle θfQ in step S220 (NO), the processing circuitry 110 executes the process of step S250 without executing the processes of steps S230, S240. In this case, the steered angle θf of the front wheels 16 has not reached the lock steered angle θfQ at the beginning of step S250. If the process of step S250 is executed in this situation, the front wheels 16 are steered such that the steered angle θf of the front wheels 16 agrees with the lock steered angle θfQ. This disables rotation of the steering wheel 11. Subsequently, the vehicle 10A performs a series of operations where the vehicle 10A turns in accordance with the request yaw rate YR*. In this case, the process of step S250 also serves as the first process and the second process.

After executing the process of step S250, the processing circuitry 110 advances the process to step S260. In step S260, the processing circuitry 110 derives the request yaw rate YR* and the request steered angle θf* in the same manner as in step S160. Subsequently, in step S270, the processing circuitry 110 functions as a remaining device control unit to adjust the steered angle θr of the rear wheels 18 based on the request yaw rate YR* derived in step S260. Specifically, the processing circuitry 110 controls the electric motor 122 of the rear-wheel steering device 120 such that the yaw rate YR agrees with the request yaw rate YR*. Then, in step S280, the processing circuitry 110 determines whether a termination condition is met. The processing content in step S280 is the same as that in step S180 shown in FIG. 4. Therefore, the explanation of the processes following step S280 is omitted.

Operation and Advantages of Second Embodiment

In the present embodiment, when the remaining device control process is executed, the steered angle θf of the front wheels 16 is adjusted by steering the rear wheels 18. The principle will now be described. A case will be discussed in which the vehicle 10A is traveling straight ahead. The rear wheels 18 are then steered rightward as indicated by the solid lines in FIG. 8. Accordingly, the vehicle 10A attempts to turn to the left as indicated by arrow N in FIG. 8. At this time, a self-aligning torque acts on the front wheels 16. As a result, as indicated by solid lines in FIG. 8, the front wheels 16 are steered to the right in the same phase as the rear wheels 18. In the present embodiment, the steered angle θf of the front wheels 16 is adjusted by using the self-aligning torque that acts on the front wheels 16 in accordance with such steering of the rear wheels 18. It is possible to cause the vehicle 10A to travel straight ahead by steering the front wheels 16 and the rear wheels 18 in the same direction.

In view of the above-described principle, a case will be described in which the vehicle 10A is caused to turn with an anomaly in the front-wheel steering device 40.

Figure 9:
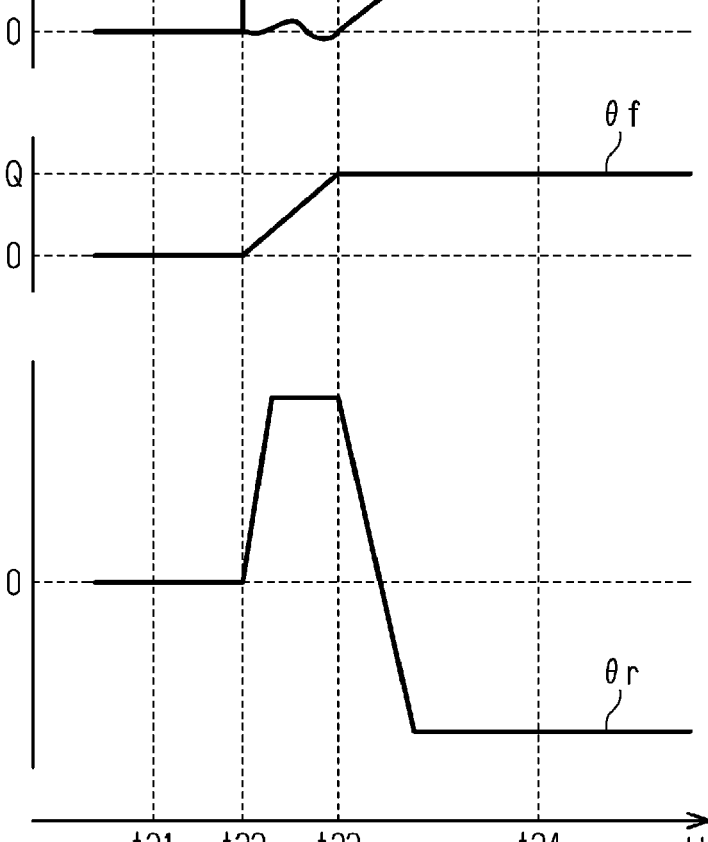
FIG. 9 is a timing diagram showing the behavior of the vehicle generated by executing the processing routine of the automatic steering function shown in FIG. 7 when an anomaly occurs in a front-wheel steering device while the vehicle is traveling straight ahead.

FIG. 9 shows an example in which there is an anomaly in the front-wheel steering device 40 in a situation in which the vehicle 10A is traveling straight ahead. In this example, the vehicle 10A is traveling straight ahead at a point in time t21. At a point in time t22, which is after the point in time t21, a turning request is generated as indicated by the long-dash double-short-dash line in part (a) of FIG. 9, so that the request yaw rate YR* becomes greater than 0 (zero). In the example of FIG. 9, an anomaly occurs in the front-wheel steering device 40, so that the front-wheel steering device 40 cannot be activated (S40: NO). Therefore, at the point in time t22, the state of the steering wheel lock mechanism 20 is switched from the deactivated state to the activated state (S110). As shown in part (b) of FIG. 9, the steered angle θf of the front wheels 16 at the point in time t22 is 0 (zero), and the absolute value of the steered angle θf is less than the absolute value of the lock steered angle θfQ. Therefore, at the point in time t22, at which the steering wheel lock mechanism 20 is switched to the activated state, rotation of the steering wheel 11 and steering of the front wheels 16 are still allowed.

Figure 10:
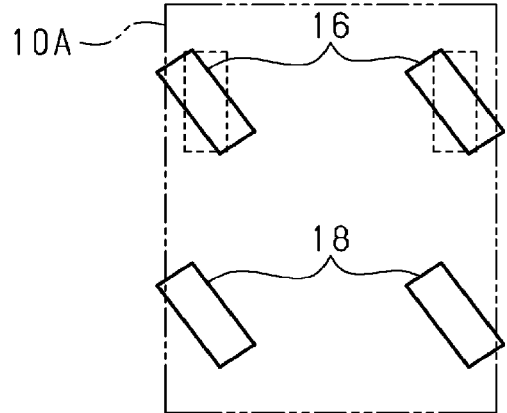
FIG. 10 is a schematic diagram showing a steering action of the front wheels and the rear wheels resulting from execution of the processing routine of the automatic steering function shown in FIG. 7 when an anomaly occurs in the front-wheel steering device while the vehicle is traveling straight ahead.

During a certain period after the point in time t22, at which the steering wheel lock mechanism 20 is switched to the activated, the rear wheels 18 are steered in the same direction as the request steered angle θf* of the front wheels 16 (S230) as shown in part (c) of FIG. 9 and FIG. 10. Accordingly, as indicated by the solid lines in part (b) of FIG. 9 and FIG. 10, the front wheels 16 are steered in the same direction as the rear wheels 18 in response to the operation of the front wheels 16 caused by the self-aligning torque. When the steered angle θf of the front wheels 16 reaches the lock steered angle θfQ at a point in time t23 (S240: YES), the distal end 22a of the locking pin 22 is received by one of the locking recesses 12a in the steering wheel lock mechanism 20. This disables steering of the front wheels 16 and rotation of the steering wheel 11.

Figure 11:
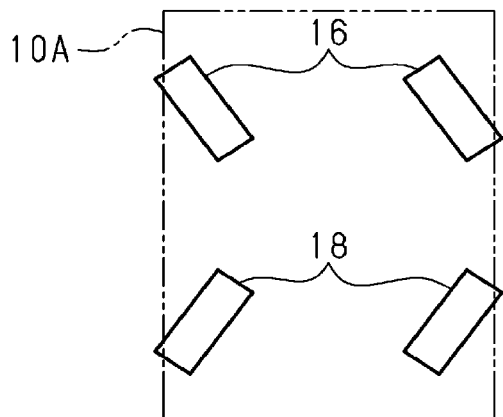
FIG. 11 is a schematic diagram showing a steering action of the front wheels and the rear wheels resulting from execution of the processing routine of the automatic steering function shown in FIG. 7 when an anomaly occurs in the front-wheel steering device while the vehicle is traveling straight ahead.

After the point in time t23, the rear wheels 18 are steered in a direction opposite to the direction of the request steered angle θf* of the front wheels 16 as shown in part (c) of FIG. 9 and FIG. 11 (S250). Accordingly, as shown in part (a) of FIG. 9, the yaw rate YR of the vehicle 10A gradually approaches the request yaw rate YR*. Eventually, the yaw rate YR of the vehicle 10A agrees with the request yaw rate YR* at a point in time t24. The vehicle 10A turns in accordance with the request yaw rate YR*. At this time, since steering of the front wheel 16 is disabled, the vehicle 10A can turn without being influenced by the self-aligning torque.

Figure 12:
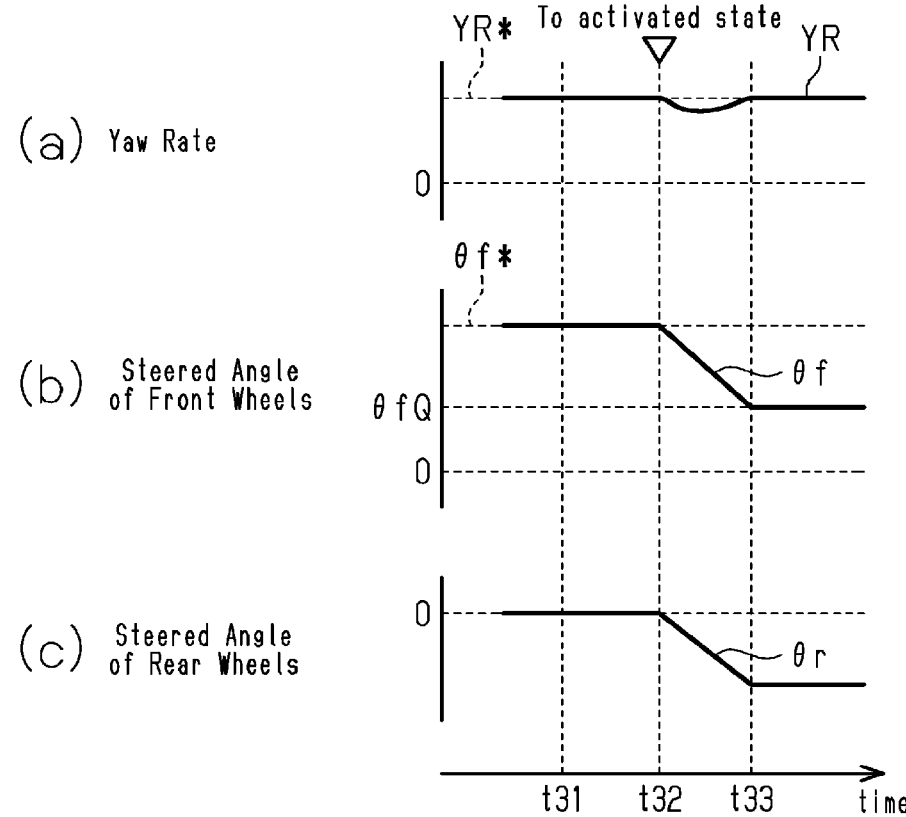
FIG. 12 is a timing diagram showing the behavior of the vehicle generated by executing the processing routine of the automatic steering function shown in FIG. 7 when an anomaly occurs in the front-wheel steering device while the vehicle is turning.
Figure 13:
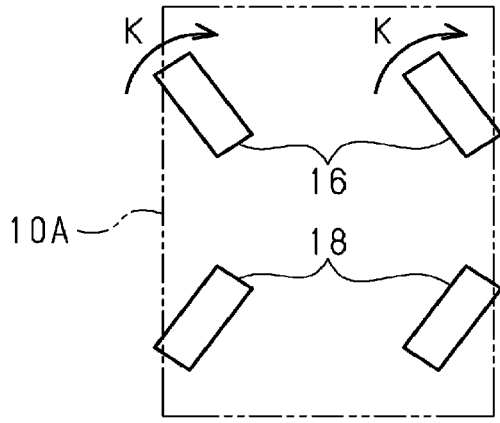
FIG. 13 is a schematic diagram showing steering actions of the front wheels and the rear wheels generated by executing the processing routine of the automatic steering function shown in FIG. 7 when an anomaly occurs in the front-wheel steering device while the vehicle is turning.

FIG. 12 shows an example in which there is an anomaly in the front-wheel steering device 40 in a situation in which the vehicle 10A is turning. In this example, the vehicle 10A is turning at a point in time t31 as shown in part (a) of FIG. 12. At this point in time, the front-wheel steering device 40 is operating normally, and the front-wheel steering device 40 is activated to adjust the steering of the front wheels 16 such that the steered angle θf of the front wheels 16 agrees with the request steered angle θf*. At this time, the steered angle θr of the rear wheel 18 is 0 (zero). At a point in time t32, which is after the point in time t31, an anomaly occurs in the front-wheel steering device 40, so that the front-wheel steering device 40 cannot be activated (S40: NO). In this case, at the point in time t32, the state of the steering wheel lock mechanism 20 is switched from the deactivated state to the activated state (S110). As shown in part (b) of FIG. 12, the steered angle θf of the front wheels 16 at the point in time t32 is greater than the lock steered angle θfQ, and the steered angle θf is not the lock steered angle θfQ. Therefore, at the point in time t32, at which the steering wheel lock mechanism 20 is switched to the activated state, rotation of the steering wheel 11 and steering of the front wheels 16 are still allowed.

At the point in time t32, the vehicle 10A is turning, and the steered angle θf is greater than the lock steered angle θfQ (S220: NO). After the point in time t32, the rear wheels 18 are steered in a direction opposite to the direction of the request steered angle θf* of the front wheels 16 as shown in part (c) of FIG. 12 and FIG. 13. Accordingly, as indicated in part (b) of FIG. 12 and by arrows K in FIG. 13, the front wheels 16 are steered in the same direction as the rear wheels 18 in response to the operation of the front wheels 16 caused by the self-aligning torque, so that the absolute value of the steered angle θf of the front wheels 16 decreases. At a point in time t33, the steered angle θf of the front wheels 16 reaches the lock steered angle θfQ. Then, the distal end 22a of the locking pin 22 of the steering wheel lock mechanism 20 is received by one of the locking recesses 12a. This disables steering of the front wheels 16 and rotation of the steering wheel 11. Thereafter, the turning of the vehicle 10A is continued in accordance with the request yaw rate YR* by adjusting the steered angle θr of the rear wheels 18. At this time, since steering of the front wheel 16 is disabled, the vehicle 10A can turn without being influenced by the self-aligning torque.

In this manner, in the present embodiment, when there is an anomaly in the front-wheel steering device 40, steering of the front wheels 16 is disabled before the rear wheels 18 adjust the yaw rate YR of the vehicle 10A. If steering of the front wheel 16 is disabled, there is no influence of the self-aligning torque. Therefore, even if the front-wheel steering device 40 cannot be used, the vehicle 10A can turn without being affected by the self-aligning torque.

Modifications

The above-described embodiments may be modified as follows. The above-described embodiments and the following modifications can be combined as long as the combined modifications remain technically consistent with each other.

The above-described termination conditions are not limited to those in the above-described embodiments as long as the remaining device control process can be ended at an appropriate time. Even in a case in which termination condition is changed from the examples in the above-described embodiments, it is preferred that the remaining device control process be terminated after the completion of the turning of the vehicle 10, 10A. When the vehicle 10, 10A is switched from autonomous driving by the autonomous driving function to manual driving by the driver while traveling straight ahead, the driver is unlikely to experience a significant operational burden.

The method of determining whether there is an anomaly in the front-wheel steering device 40 is not limited to the one described in the above-described embodiments. For example, it may be determined that there is an anomaly in the front-wheel steering device 40 when the temperature MT of the electric motor 42 is higher than a specified threshold value. In a case in which the front-wheel steering device 40 cannot be used normally regardless of the method of determining an anomaly, in other words, how an anomaly is defined, the yaw rate YR of the vehicle 10, 10A may be adjusted by switching the steering wheel lock mechanism 20 to the activated state and using a vehicle device other than the front-wheel steering device 40.

When an anomaly occurs in the front-wheel steering device 40, the notification device 90 does not necessarily need to issue a notification indicating the anomaly. For example, when an anomaly occurs in the front-wheel steering device 40, the notification by the notification device 90 is not necessarily needed if the autonomous driving function is deactivated when the turning of the vehicle 10 or 10A is completed, and the driver is notified of the completion of the turning.

After the yaw rate YR of the vehicle 10, 10A is adjusted by a vehicle device other than the front-wheel steering device 40 as in the above-described embodiments, the steering wheel lock mechanism 20 may be switched to the deactivated state after the end of turning of the vehicle 10, 10A. For example, the front-wheel steering device 40 may be accidentally determined to have an anomaly. In this case, even if the yaw rate YR of the vehicle 10, 10A is once adjusted by a vehicle device other than the front-wheel steering device 40 as in the above-described embodiments, the front-wheel steering device 40 can be used again thereafter. When the steering wheel lock mechanism 20 is switched to the deactivated state, the front-wheel steering device 40 is capable of steering the front wheels 16 as in a normal state.

Regarding the second embodiment, the configuration of the rear-wheel steering device 120 is not limited to the above-described example. The rear-wheel steering device 120 may be modified as long as it can adjust the steered angle θr of the rear wheels 18.

Figure 14:
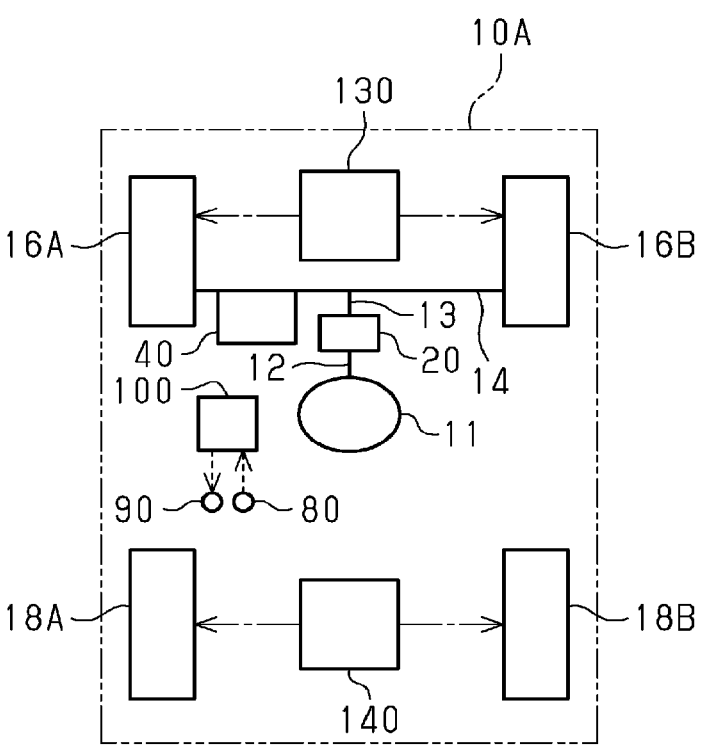
FIG. 14 is a schematic diagram showing a modification of the second embodiment.

As shown in FIG. 14, in the second embodiment, the vehicle 10A may include the following two devices in place of the rear-wheel steering device 120. The two devices are a front-wheel driving device 130, which adjusts the difference in driving force applied to the left front wheel 16A and the right front wheel 16B, and a rear-wheel driving device 140, which adjusts the difference in driving force applied to the left rear wheel 18A and the right rear wheel 18B. The front-wheel driving device 130 and the rear-wheel driving device 140 are vehicle devices configured to adjust the yaw rate YR of the vehicle 10A. Even in a case in which these driving devices are provided, the same principle as the second embodiment can be used to cause the vehicle 10A to turn without using the front-wheel steering device 40. For example, in a case in which an anomaly occurs in the front-wheel steering device 40 while the vehicle 10A is traveling straight ahead, the first process of the remaining device control process is executed by the front-wheel driving device 130 to create a difference in the driving force between the left front wheel 16A and the right front wheel 16B after the steering wheel lock mechanism 20 is switched to the activated state. Accordingly, the front wheels 16 are steered such that the steered angle θf of the front wheels 16A, 16B agrees with the lock steered angle θfQ. As the first process, the rear-wheel driving device 140 may be used to produce a difference in driving force between the left rear wheel 18A and the right rear wheel 18B. Accordingly, the self-aligning torque applied to the two front wheels 16A, 16B may be used to steer the front wheels 16 such that the steered angle θf of the front wheels 16A, 16B agrees with the lock steered angle θfQ. Subsequently, as the second process of the remaining device control process, the rear-wheel driving device 140 is used to create a difference in the driving force between the left rear wheel 18A and the right rear wheel 18B. This adjusts the yaw rate YR of the vehicle 10A. When an anomaly occurs in the front-wheel steering device 40 during turning of the vehicle 10A, the rear-wheel driving device 140 may be used to create a difference in the driving force between the left rear wheel 18A and the right rear wheel 18B. This also allows the first process and the second process to be integrated. In FIG. 14, the same symbols as those in FIG. 6 are assigned to parts that are identical or substantially identical in function to those in FIG. 6. The same applies to FIG. 15, which will be referred to below.

In the above-described modification, the vehicle 10A may include only the rear-wheel driving device 140 of the front-wheel driving device 130 and the rear-wheel driving device 140. As described above, the vehicle 10A can turn in the same manner as the second embodiment if the rear-wheel driving device 140 is provided.

Figure 15:
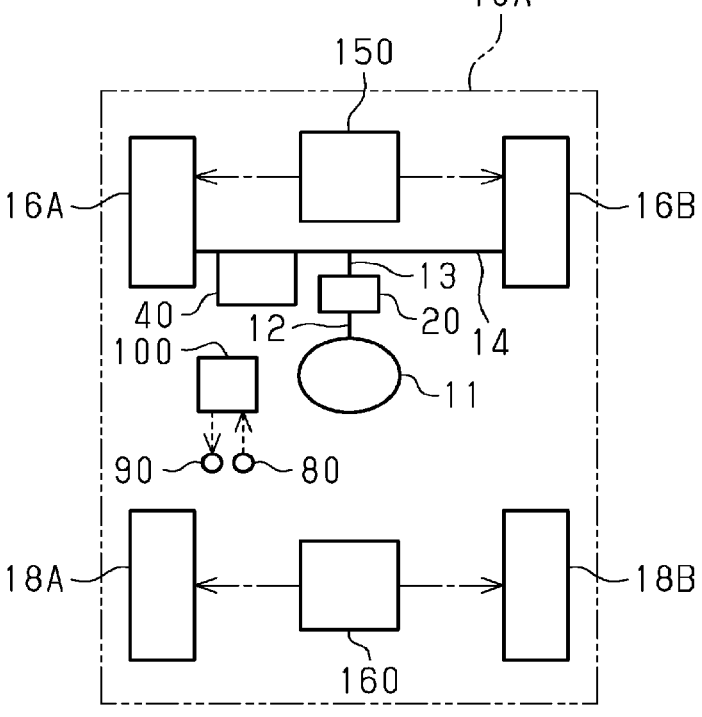
FIG. 15 is a schematic diagram showing another modification of the second embodiment.

As shown in FIG. 15, in the second embodiment, the vehicle 10A may include the following two devices in place of the rear-wheel steering device 120. The two devices are a front-wheel braking device 150, which adjusts the difference in braking force applied to the left front wheel 16A and the right front wheel 16B, and a rear-wheel braking device

160, which adjusts the difference in braking force applied to the left rear wheel 18A and the right rear wheel 18B. The front-wheel braking device 150 and the rear-wheel braking device 160 are vehicle devices configured to adjust the yaw rate YR of the vehicle 10A. Like the above-described modification with the driving devices, the braking devices allow the vehicle 10A to turn in the same manner as in the second embodiment. In other words, instead of creating a difference in the driving force between the left and right wheels as in the driving devices of the above-described modification, it suffices to create a difference in the braking force between the left and right wheels.

The vehicle 10A may include multiple vehicle devices other than the front-wheel steering device 40. For example, the vehicle 10A may include the rear-wheel steering device 120, the front-wheel driving device 130, and the rear-wheel driving device 140. Further, the vehicle 10A may include, for example, the rear-wheel steering device 120, the front-wheel braking device 150, and the rear-wheel braking device 160. Also, the vehicle 10A may include, for example, the rear-wheel steering device 120, the front-wheel driving device 130, the rear-wheel driving device 140, the front-wheel braking device 150, and the rear-wheel braking device 160. These combinations are used to cause the vehicle 10A to turn in the same manner as in the second embodiment.

The configuration of the front-wheel steering device 40 is not limited to the example in the above-described embodiments. For example, the front-wheel steering device 40 may be coupled to the output shaft 13. Further, the steering force may be applied to the steering shaft 14 through the output shaft 13. The front-wheel steering device 40 may be modified as long as it is configured to apply a steering force to the steering shaft 14.

The steering wheel lock mechanism 20 is not limited to the example in the above-described embodiments. For example, the number and the positions of the locking recesses 12a may be changed from the example in the above-described embodiments. In other words, the lock angle θhQ may be changed. The number and positions of the locking recesses 12a may be changed as long as rotation of the steering wheel 11 can be disabled at an appropriate steering angle θh. The steering wheel lock mechanism 20 does not need to use the locking recesses 12a and the locking pin 22. The steering wheel lock mechanism 20 may have any configuration as long as it is switched to the activated state, in which rotation of the steering wheel 11 is disabled, and the deactivated state, in which rotation of the steering wheel 11 is permitted.

The configuration of the steered angle adjustment device 30 is not limited to the example of the first embodiment. The steered angle adjustment device 30 may have any configuration as long as it adjusts the steered angle ratio Z by rotating the input shaft 12 and the output shaft 13 relative to each other.

A vehicle device capable of adjusting the amount of lateral movement of the vehicle 10, 10A and capable of being employed as a vehicle device other than the front-wheel steering device 40 is not limited to those described in the above-described embodiments and modifications. Any configuration may be employed as long as the amount of lateral movement of the vehicle 10, 10A can be adjusted when the steering wheel lock mechanism 20 is activated to disable rotation of the steering wheel 11. The content of the remaining device control process may be adjusted in accordance with the employed vehicle device. The remaining device control process may be changed as long as the vehicle 10, 10A can turn properly when rotation of the steering wheel 11 is disabled.

In place of the yaw rate, the lateral movement amount of the vehicle 10, 10A may be the lateral position, the curvature of turn, the lateral speed, or the lateral acceleration of the vehicle 10, 10A.

The processing circuitry 110 of the control device 100 is not limited to a device that includes a CPU and a ROM and executes software processing. That is, the processing circuitry 110 may be modified as long as it has any one of the following configurations (a) to (c).

(a) The processing circuitry 110 includes one or more processors that execute various processes according to computer programs. The processor includes a CPU and a memory such as RAM and ROM. The memory stores program codes or instructions configured to cause the CPU to execute processes. The memory, which is a computer-readable medium, includes any type of media that are accessible by general-purpose computers and dedicated computers.

(b) The processing circuitry 110 includes one or more dedicated hardware circuits that execute various processes. The dedicated hardware circuits include, for example, an application specific integrated circuit (ASIC) and a field programmable gate array (FPGA).

(c) The processing circuitry 110 includes a processor that executes part of various processes according to programs and a dedicated hardware circuit that executes the remaining processes.

In the present disclosure, "at least one of A and B" means "only A, only B, or both A and B." For multiple elements listed with "and" (A, B, . . . ), "at least one of the multiple elements" means "only one element selected from the multiple elements, or any two or more elements selected from the multiple elements."

The invention claimed is:

1. A vehicle control device employed in a vehicle, wherein the vehicle includes:

wheels;

vehicle devices configured to adjust a lateral movement amount of the vehicle;

a steering wheel lock mechanism that is selectively switched between an activated state in which the steering wheel lock mechanism disables rotation of a steering wheel and a deactivated state in which the steering wheel lock mechanism allows rotation of the steering wheel; and a steering shaft that is coupled to front wheels of the wheels and steers the front wheels by being actuated in accordance with rotation of the steering wheel, the vehicle devices include:

a front-wheel steering device that applies, to the steering shaft, a steering force for steering the front wheels; and a remaining device that is a device other than the front-wheel steering device, the vehicle control device comprising:

a steering wheel lock control unit that, when there is an anomaly in the front-wheel steering device, switches the state of the steering wheel lock mechanism from the deactivated state to the activated state; and a remaining device control unit that adjusts the lateral movement amount of the vehicle by activating the remaining device when the steering wheel lock mechanism is in the activated state, the remaining device includes a steered angle adjustment device that isolates transmission of force between the steering wheel and the steering shaft, the steered angle adjustment device generates relative rotation between an input shaft that rotates integrally with the steering wheel and an output shaft that rotates in conjunction with operation of the steering shaft, thereby adjusting a steered angle ratio that is a ratio of a steered angle of the front wheels to a steering angle that is a rotation angle of the steering wheel, in the activated state, the steering wheel lock mechanism disables rotation of the steering wheel when the steering angle agrees with a preset lock angle, in the deactivated state, the steering wheel lock mechanism allows rotation of the steering wheel even if the steering angle is the lock angle, the vehicle control device further comprises a request generating unit that calculates a request steered angle, the request steered angle being a requested value of a steered angle of the front wheels, and when the steering wheel lock mechanism is in the activated state, the remaining device control unit activates the steered angle adjustment device to adjust the steered angle ratio such that the steered angle of the front wheels agrees with the request steered angle.

2. A vehicle control device employed in a vehicle, wherein the vehicle includes:

wheels;

vehicle devices configured to adjust a lateral movement amount of the vehicle;

a steering wheel lock mechanism that is selectively switched between an activated state in which the steering wheel lock mechanism disables rotation of a steering wheel and a deactivated state in which the steering wheel lock mechanism allows rotation of the steering wheel; and a steering shaft that is coupled to front wheels of the wheels and steers the front wheels by being actuated in accordance with rotation of the steering wheel, the vehicle devices include:

a front-wheel steering device that applies, to the steering shaft, a steering force for steering the front wheels; and a remaining device that is a device other than the front-wheel steering device, the vehicle control device comprising:

a steering wheel lock control unit that, when there is an anomaly in the front-wheel steering device, switches the state of the steering wheel lock mechanism from the deactivated state to the activated state; and a remaining device control unit that adjusts the lateral movement amount of the vehicle by activating the remaining device when the steering wheel lock mechanism is in the activated state, the steering shaft operates in conjunction with rotation of the steering wheel, the remaining device includes at least one of a rear-wheel steering device that adjusts a steered angle of rear wheels of the wheels, a braking device that is configured to adjust a difference in braking force between a left wheel and a right wheel of the wheels, and a driving device configured to adjust a difference in driving force between the left wheel and the right wheel, in the activated state, the steering wheel lock mechanism disables rotation of the steering wheel when a steering angle that is a rotation angle of the steering wheel agrees with a preset lock angle, in the deactivated state, the steering wheel lock mechanism allows rotation of the steering wheel even if the steering angle is the lock angle, the steered angle of the front wheels when the steering angle is the lock angle agrees with a lock steered angle, and the remaining device control unit executes a first process that, when the steering wheel lock mechanism is in the activated state, activates the remaining device to cause the steered angle of the front wheels to be the lock steered angle, thereby disabling rotation of the steering wheel, and a second process that activates the remaining device to cause the vehicle to turn when the first process is executed to disable rotation of the steering wheel.

* * * * *